United States Patent [19]

Maurer et al.

[11] Patent Number: 4,600,621

[45] Date of Patent: Jul. 15, 1986

[54] THERMOFORMABLE POLYMERIC FOAM HEADLINERS

[75] Inventors: Richard P. Maurer, Wilbraham, Mass.; James S. Holtrop, South Windsor, Conn.

[73] Assignee: Monsanto Company, St. Louis, Mo.

[21] Appl. No.: 687,063

[22] Filed: Dec. 28, 1984

[51] Int. Cl.[4] .................... B32B 3/04; B32B 3/06; B32B 7/09

[52] U.S. Cl. .................... 428/121; 296/214; 428/124; 428/126; 428/130; 428/304.4; 428/314.2

[58] Field of Search ............. 296/211, 214; 428/121, 428/124, 126, 130, 157, 159, 160, 304.4, 314.2

[56] References Cited

U.S. PATENT DOCUMENTS

| | | | |
|---|---|---|---|
| 3,399,098 | 8/1968 | Omoto et al. | 428/126 |
| 4,186,232 | 1/1980 | Cocca | 428/319.7 |
| 4,377,614 | 3/1983 | Alfter et al. | 428/319.7 |
| 4,476,183 | 10/1984 | Holtrop et al. | 428/286 |
| 4,489,126 | 12/1984 | Holtrop et al. | 428/246 |
| 4,526,829 | 7/1985 | Holtrop et al. | 428/245 |
| 4,529,641 | 7/1985 | Holtrop et al. | 428/198 |
| 4,531,994 | 7/1985 | Holtrop et al. | 428/304.4 |
| 4,557,970 | 12/1985 | Holtrop et al. | 428/316.6 |

*Primary Examiner*—William J. Van Balen
*Attorney, Agent, or Firm*—Thomas E. Kelley

[57] ABSTRACT

Thermoformable laminate structure with a retroflexed margin comprises at least one sheet of thermoplastic foam having a polymer-impregnated cloth adhered to at least one side thereof. Such laminate structure is useful in an automobile headliner assembly where hidden clips engage the retroflexed margin to hold the headliner proximate the roof without the need for garnish molding.

8 Claims, 7 Drawing Figures

THERMOFORMABLE POLYMERIC FOAM HEADLINERS

This invention relates to thermoformable, polymeric foam headliners having a retroflexed margin and to automotive vehicle headliner assemblies utilizing such thermoformable polymeric foam headliners having retroflexed margins.

BACKGROUND OF THE INVENTION

Styrenic foam laminates have been used as acoustical and thermal insulation for a variety of applications, for instance as automobile headliners. Recent advances in this area have lead to the development of thermoformable styrenic foam laminates which can be provided in complex shapes. Such laminates are able to retain a desired shape because of the use of deformation-resistant coatings, for instance a polymeric-impregnated cloth facing on at least one surface of the styrenic foam components. For illustrative laminates see U.S. Pat. Nos. 4,476,183; 4,489,126; 4,526,829; 4,531,994; 4,557,970; 4,529,641 and U.S. patent application Ser. No. 653,658 filed Sept. 1, 1984 all of which are incorporated herein by reference.

Such laminates can be preheated to thermoforming temperatures of the styrenic foam components prior to thermoforming to useful shapes for acoustical and thermal insulation applications. When such thermoforming shapes are used as automobile headliners, a decorative trim, such as polyurethane foam, covered with a decorative fabric or vinyl facing, is generally utilized for an enhanced aesthetic appearance. Headliners of such thermoformed laminates have been attached to the interior roof panels of automobiles by a number of means including, for instance, visor brackets, dome lights, garment hooks and fasteners with decorative heads inserted through the headliner and anchored in holes in steel framing. The margins of the headliners are generally anchored to framing at the lower side of the roof panels. For instance, the side edges of the headliners are often secured to the lower roof panel by use of garnish molding which is fastened to framing members. Such garnish molding also covers the unsightly edge of the headliner where the interior layers of the laminate are often exposed. In some cases, for instance at the windshield edge of the headliner, garnish molding had not been used but rather visor brackets and fasteners with colored heads have been used to secure the headliner to the lower edge of the roof panel. In some cases the unsightly lower edge of the laminate has been covered by edge wrapping with the decorative trim.

An object of this invention is to provide a thermoformable automotive vehicle headliner of a thermoplastic foam laminate with an improved margin that can be fastened in an aesthetically pleasing manner to automobile roofs without the use of garnish molding or other fasteners exposed on the decorative surface of the headliner.

Another object of this invention is to provide a thermoformable laminate structure of a thermoplastic foam sheet having a substantially rigid retroflexed margin.

A further object of this invention is to provide an automotive vehicle headliner assembly with means for engaging the headliner with a retroflexed margin without the use of garnish molding.

These and other objects of this invention will be apparent from the following description and claims.

SUMMARY OF THE INVENTION

This invention provides a thermoformable laminate structure of at least one sheet of thermoplastic foam. At least a portion of the margin of the laminate structure is retroflexed.

This invention also provide a headliner assembly comprising a headliner panel of such thermoformable laminate structure and means for engaging the retroflexed margin to hold the headliner panel proximate to the roof.

DESCRIPTION OF THE PREFERRED EMBODIMENTS

Figure 1:
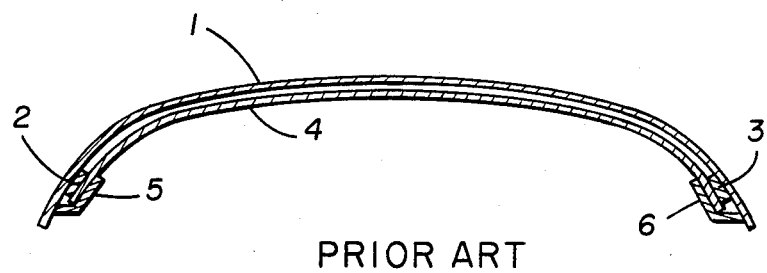
FIG. 1 is a schematic illustration of a headliner assembly where the headliner is attached to the roof by garnish molding as utilized in the prior art.

The thermoformable laminate structure of this invention has at least one sheet of thermoplastic foam having a polymer-impregnated cloth adhered to at least one side thereof. The at least one sheet of thermoplastic foam preferably comprises polystyrene; however, other foamed thermoplastic materials such as foamed styrene-maleic anhydride polymer, foamed styrene-acrylonitrile polymer, other copolymers of polystyrene, foamed polyethylene and other similar materials may also be used.

The thermoformable laminate structure may comprise a single sheet of thermoplastic foam having a polymer-impregnated cloth adhered to at least one side thereof. Alternatively such structure may have two or more sheets of such thermoplastic foam or, alternatively, sheets of other materials laminated to the at least one sheet of thermoplastic foam. For instance, it is often desirable when forming automobile headliners to provide a thermoformable laminate structure having two outer sheets of a polystyrene foam laminated to an inner sheet of a polyurethane foam.

There are no limits on the thickness of the sheets of thermoplastic foam or other materials included in the laminate structure. However the thicknesses used are limited to that which is easily laminated. The thickness of a sheet of thermoplastic material used in this invention will generally be less than 30 millimeters and it is preferred that the thickness of a sheet of foamed polystyrene material be between 2.0 and 20 millimeters.

A coating comprising a polymer-impregnated cloth is bonded to at least one side of at least one sheet of thermoplastic foam. In many cases it is preferable that both sides of a sheet of thermoplastic foam have a polymer-impregnated cloth adhered thereto. In this regard the polymer-impregnated cloth provides stability to the laminate structure, for instance a composite laminate, which has been thermoformed into a complex shape at thermoforming temperatures in the range of say about 130° C. to about 150° C. when the thermoplastic foam comprises polystyrene. Within such a temperature range polystyrene foam is readily thermoformable without adverse foam collapse. When other thermoplastic foam materials are utilized higher temperature ranges are useful. For instance thermoplastic foam comprising styrene-maleic anhydride copolymers can be satisfactorily thermoformed at temperatures up to about 180° C.

The cloth which provides support for the polymer being applied to the surface of the thermoplastic sheet can comprise a variety of textile structures for instance, the cloth can be woven or non-woven. A desired characteristic of the fabric is that it elongated sufficiently in any direction in its surface to conform to the desired complex shape to be imparted by the thermoforming process. Desirable fabric will elongate, for instance in the range of about 10–50%, at thermoforming temperature without destroying the integrity in the fabric structure. A preferred cloth which can undergo such elongation comprises non-woven cloth such as non-woven, spun-bonded polyester cloth. Other cloths which may be useful include non-woven polyester cloth, non-woven nylon cloth and non-woven polypropylene cloth. The cloth can have any thickness which may be desired. Typically useful cloth will have a thickness in the range of 0.05 to 1.0 millimeters. However, a cloth having a larger thickness can be useful. Preferably the cloth will be non-woven and will have a thickness of from 0.1 to 0.4 millimeters.

The polymer used to impregnate the cloth is preferably an acrylic resin having a high softening temperature, that is, a softening temperature greater than approximately 75° C. Useful polymers and methods of fabricating thermoformable laminate structures utilizing sheets of thermoplastic foam having a polymer-impregnated cloth adhered to at least one side are described in U.S. Pat. Nos. 4,476,183; 4,489,126; 4,526,829; 4,531,994; 4,557,970; 4,529,641 and U.S. patent application Ser. No. 653,658 filed Sept. 1, 1984 all of which are incorporated herein by reference.

The thermoformable laminate structure of this invention is in the form of an expanse with peripheral margins. Within the area of the margin the laminate structure is retroflexed (i.e. folded back upon itself) to form a doubled laminate in the margin. Such retroflexing is generally advantageously conducted at elevated temperatures, for instance at thermoforming temperatures for the thermoplastic foam material of the laminate. It is also often advantageous to substantially compress the thermoplastic foam within the margin of the laminate structure prior to or during the retroflexing. Such a compression can result in foam collapse which provides a margin of substantially higher density than the thermoplastic foam within the remainder of the laminate structure. Such higher density of thermoplastic material in the margin assists in providing a substantially rigid margin which has desirable structural properties when the laminate structure is utilized in a headliner assembly according to this invention.

In many cases it is desirable that the retroflexed edge portion of the margin be adhered to that portion of the margin onto which it is folded. Such adhesion can be over portions of the retroflexed edge including even over substantially all of the retroflexed edge. In other cases it is advantageous to have the retroflexed edge portion of the margin free such that the line along which the margin is retroflexed is provided substantially as a hinge about which the retroflexed edge can pivot. This is especially advantageous in providing headliner assemblies according to this invention where the margins can be affixed to the roof panel without the assistance or necessity of utilizing garnish molding. In still other cases it may be desirable to provide more than one retroflexed edge portion of the margin. That is, the margin will be retroflexed once to provide a first fold and then retroflexed at a further distance from the original edge of the laminate to provide a second fold.

Figure 6:
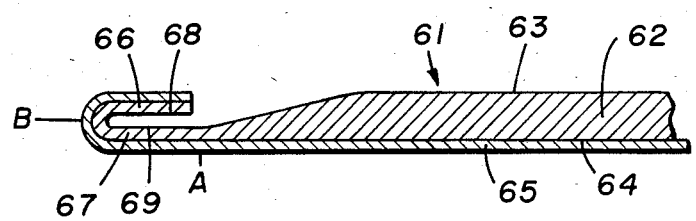
FIGS. 6 and 7 are partial schematic illustrations of a thermoformable laminate structure at a retroflexed margin according to this invention.

With reference to FIG. 6 there is schematically illustrated a portion of a thermoformable laminate structure 61 comprising a sheet of thermoplastic foam 62 having a polymer-impregnated cloth (not shown) adhered to one side 63 and a second polymer-impregnated cloth (not shown) adhered to the other side 64. A decorative trim layer 65 is adhered to one side of the laminate structure. Point A generally indicates the beginning of a margin portion of the laminate structure consisting of portions 66 and 67. Portion 66 of the margin is retroflexed at point B such that the surface 68 of portion 66 and surface 69 of portion 67 become juxtaposed. When portion 66 is retroflexed under thermoforming conditions at elevated temperatures the polymer-impregnated cloth adhered to a thermoplastic foam portion of the margin will assist in maintaining the margin in substantially a retroflexed form. After thermoforming portions 66 and 67 of the margin can be flexed about the hinge point B. Portions 66 and 67 will generally return to their retroflexed positions after flexing unless, of course, the flexing is so substantially severe as to destroy the structure of the thermoplastic foam.

Figure 7:
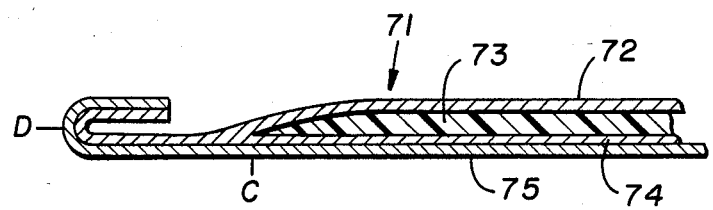

A further embodiment of the thermoformable laminate structure of this invention is schematically illustrated in FIG. 7 which shows a portion of such thermoformable laminate structure 71. This structure comprises sheets 72 and 74 comprising sheets of thermoplastic foam having a polymer-impregnated cloth (not shown) adhered to at least one side thereof. Intermediate said sheets 72 and 74 is an inner sheet 73 which can advantageously comprise a polyurethane foam material. In some cases it is desirable that the inner polystyrene foam material extend throughout the margin. In other cases it is desirable that the inner polystyrene foam material terminate at the edge of the margin, for instance, as indicated by point C. In such case sheets 72 and 74 can be adhered together at point C and extend as joined sheet throughout the margin. The margin is retroflexed at point D as in FIG. 6. The structure also has a layer of decorative trim 75.

Such laminate structures can be thermoformed prior to or after the margin is retroflexed depending on, for instance, the complexity of the thermoformed shape.

The thermoformable laminate structure of this invention can be advantageously utilized in automotive headliner assemblies. Because of the retroflexed margin the headliner can be affixed proximate the roof panel of an automotive vehicle without utilizing garnish molding as has been generally utilized with headliners of the prior art. In this regard FIG. 1 schematically illustrates a automotive headliner assembly of the prior art where headliner panel 4 is held proximate to roof panel 1 by garnish moldings 5 and 6 which are secured for instance by pins or screws (not shown) to structural members 2 and 3.

Figure 2:
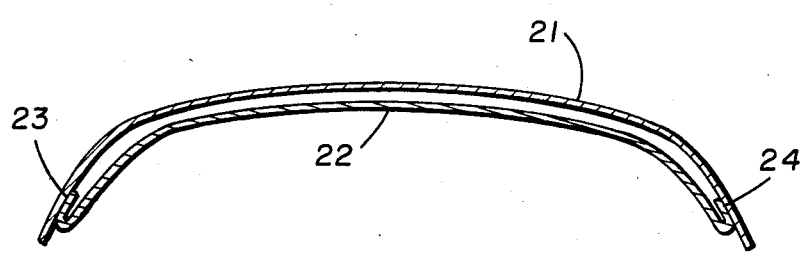
FIG. 2 is a schematic illustration of a headliner assembly according to this invention.

FIG. 2 schematically illustrates an automotive headliner assembly according to this invention where the headliner panel 22 comprises at least one thermoformable sheet of thermoplastic foam wherein at least a portion of the margin of said sheet is retroflexed to provide an edge 23 and 24 located between said headliner panel 22 and said roof panel 21. Such automotive headliner assembly further comprises means (not shown) for engaging such edges to hold the headliner panel 22 proximate to the roof panel 21.

A useful means for engaging the retroflexed edge comprises at least one clip having a free end extending downwardly. Such free end will have a barb extending up from the free end toward the roof panel. Such barb will be sufficiently close to the roof panel to allow engagement with the retroflexed edge of the headliner when the retroflexed edge of the headliner is moved into position between the roof panel and the free end of the clip. A variety of useful means for engaging the retroflexed edge of the headliner panel, including such clips, are schematically illustrated in FIGS. 3, 4 and 5.

Figure 3:
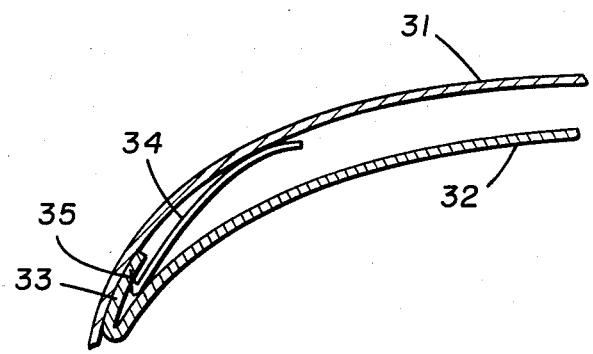
FIGS. 3, 4 and 5 are schematic illustration of the means for engaging a retroflexed margin of a headliner panel according to this invention.

In FIG. 3 headliner panel 32 is held proximate to the roof panel 31 by a clip 34 which has an upwardly extending barb 35 adapted to engage the retroflexed edge 33 of the margin of headliner panel 32.

Figure 4:
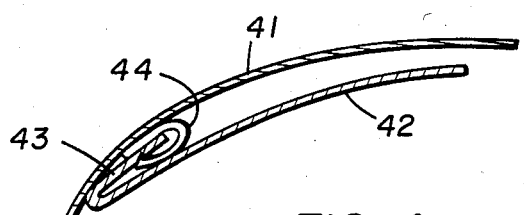

In FIG. 4 headliner panel 42 is held proximate to the roof panel 41 by a hook 44 having an upwardly extended barb which engages the retroflexed edge 43 of the margin of the headliner panel 42.

Figure 5:
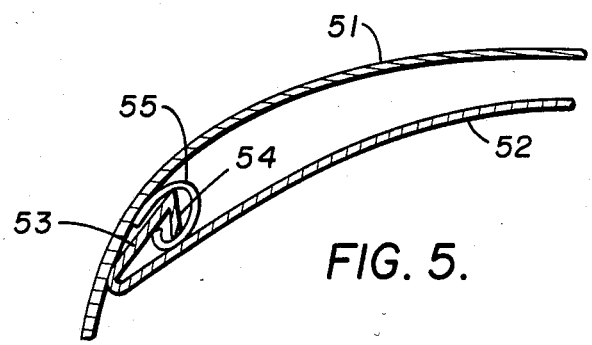

FIG. 5 illustrates a further embodiment in which headliner panel 52 is held proximate to roof panel 51 by clip 55 which is adapted to engage a first retroflexed edge 54 on a second retroflexed edge 53 in the margin of headliner panel 52.

While specific embodiments of the invention have been described, it should be apparent to those skilled in the art that various modifications can be made without departing from the true spirit and scope of the invention. Accordingly, it is intended that the scope of the following claims cover all such modifications which will fall within the full inventive concept.

We claim:

1. A thermoformable laminate structure of at least one sheet of thermoplastic foam having a polymer-impregnated cloth adhered to at least one side thereof, wherein in a margin of said structure said sheet is substantially compressed and wherein an outer edge portion of said substantially compressed margin is retroflexed onto an inner edge portion of said substantially compressed margin.

2. The structure of claim 1 wherein said thermoplastic foam comprises polystyrene or a copolymer of polystyrene.

3. The structure of claim 2 wherein said cloth comprises a non-woven fabric.

4. The structure of claim 3 wherein the cloth is impregnated with an acrylic polymer.

5. The structure of claim 4, wherein said retroflexed outer edge portion is adhered to said inner edge portion.

6. A headliner assembly for a vehicle roof panel comprising:
   (a) a headliner panel of at least one thermoformable sheet of thermoplastic foam having a polymer-impregnated cloth adhered to at least one side thereof, wherein in a margin of said panel said sheet is substantially compressed and wherein an outer edge portion of said substantially compressed margin is retroflexed onto an inner edge portion of said substantially compressed margin; and
   (b) means for engaging at least a portion of said outer edge portion to hold said headliner panel proximate to said roof panel.

7. The assembly of claim 6 wherein said means for engaging said edge comprises at least one clip having a free end extended downwardly, said free end having a barb, said barb extending up from said free end towards said roof panel, said barb being sufficiently close to the roof panel to engage the edge when said edge is moved into a position between the roof panel and said free end of the clip.

8. The assembly of claim 7 wherein a portion of said retroflexed outer edge portion is adhered to said inner edge portion.

* * * * *